United States Patent
Yang et al.

(10) Patent No.: US 7,573,548 B2
(45) Date of Patent: Aug. 11, 2009

(54) COLOR FILTER SUBSTRATE, METHOD OF MANUFACTURING THE SAME AND DISPLAY APPARATUS HAVING THE SAME

(75) Inventors: Seok-Yoon Yang, Cheonan-si (KR); Gug-Rae Jo, Cheonan-si (KR); Yun-Seok Lee, Cheonan-si (KR); Ju-Yong Park, Asan-si (KR); Sun-Mi Kim, Incheon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 64 days.

(21) Appl. No.: 11/482,449

(22) Filed: Jul. 7, 2006

(65) Prior Publication Data
US 2007/0008462 A1    Jan. 11, 2007

(30) Foreign Application Priority Data
Jul. 8, 2005    (KR) ............... 10-2005-0061552

(51) Int. Cl.
*G02F 1/1335* (2006.01)
(52) U.S. Cl. ................. 349/106; 349/113
(58) Field of Classification Search ............. 349/110, 349/187, 106, 113; 348/290
See application file for complete search history.

(56) References Cited

U.S. PATENT DOCUMENTS

| | | | | |
|---|---|---|---|---|
| 4,902,103 A * | 2/1990 | Miyake et al. | ........... | 349/144 |
| 5,296,935 A * | 3/1994 | Bresler | ........... | 358/406 |
| 5,920,299 A * | 7/1999 | Ohshima et al. | ........... | 345/88 |
| 6,614,498 B1 * | 9/2003 | Tanaka et al. | ........... | 349/143 |
| 6,690,448 B2 * | 2/2004 | Kawase et al. | ........... | 349/187 |
| 6,704,075 B2 * | 3/2004 | Takizawa et al. | ........... | 349/106 |
| 6,714,206 B1 * | 3/2004 | Martin et al. | ........... | 345/589 |
| 6,714,212 B1 * | 3/2004 | Tsuboyama et al. | ........... | 345/696 |
| 6,995,898 B2 * | 2/2006 | Otake et al. | ........... | 359/318 |
| 7,184,066 B2 * | 2/2007 | Elliot et al. | ........... | 345/694 |
| 7,248,314 B2 * | 7/2007 | Yun | ........... | 349/108 |
| 7,255,981 B2 * | 8/2007 | Otake et al. | ........... | 430/321 |
| 2001/0033441 A1 * | 10/2001 | Takizawa et al. | ........... | 359/891 |
| 2002/0015110 A1 * | 2/2002 | Brown Elliott | ........... | 348/589 |
| 2002/0097356 A1 * | 7/2002 | Kawase et al. | ........... | 349/106 |
| 2003/0218698 A1 * | 11/2003 | Otake et al. | ........... | 349/42 |
| 2004/0160553 A1 * | 8/2004 | Otake et al. | ........... | 349/113 |

(Continued)

FOREIGN PATENT DOCUMENTS

JP    2001 305328    10/2001

OTHER PUBLICATIONS

English Abstract for Publication No. 2001-305328.

*Primary Examiner*—James P Hughes
*Assistant Examiner*—Peter Radkowski
(74) *Attorney, Agent, or Firm*—F. Chau & Associates, LLC

(57) ABSTRACT

A color filter substrate is provided. The color filter substrate includes a base substrate, a first color filter and a second color filter. The base substrate includes a first pixel region and a second pixel region that has a first sub-region and a second sub-region. The first color filter is formed in a first pixel region and a first sub-region of the second pixel region. The second color filter is formed in a second sub-region of the second pixel region.

40 Claims, 8 Drawing Sheets

U.S. PATENT DOCUMENTS

2005/0083356 A1* 4/2005 Roh et al. .................... 345/698
2006/0038953 A1* 2/2006 Moriya ....................... 349/144
2006/0044240 A1* 3/2006 Takizawa et al. .............. 345/88
2007/0182682 A1* 8/2007 Hong et al. ................... 345/88

* cited by examiner

COLOR FILTER SUBSTRATE, METHOD OF MANUFACTURING THE SAME AND DISPLAY APPARATUS HAVING THE SAME

CROSS-REFERENCE TO RELATED APPLICATIONS

This application relies for priority upon Korean Patent Application No. 2005-61552 filed on Jul. 8, 2005, the disclosure of which is hereby incorporated by reference herein in its entirety.

BACKGROUND OF THE INVENTION

1. Technical Field

The present disclosure relates to a color filter substrate, a method of manufacturing the color filter substrate and a display apparatus having the color filter substrate.

2. Description of the Related Art

Images and videos for broadcasting or package media may be produced on the basis of, for example, the three primary colors of red, green and blue (RGB color system) used by cathode ray tube (CRT) televisions. However, an image-reproducing method which utilizes only the three primary colors of red, green and blue may not approach the color perceiving ability of the human eye. In other words, the color reproducibility of an image generated on the basis of the three primary colors of red, green and blue may be inferior to the color perceiving ability of the human eye. Therefore, an image-reproducing method should include additional colors besides the three primary colors.

Furthermore, digital versatile disc (DVD) devices and digital broadcasting devices display images using a YCbCr signal system. Thus, the DVD devices and the digital broadcasting devices include red, green and blue (RGB) signals, as well as additional signals that are different from the RGB signals. The YCbCr signal system used in the digital broadcast devices and the DVD devices includes a color gamut that may not be achieved with the RGB color system. However, with the YCbCr signal system, image distortions and display quality degradations may occur.

Thus, methods have been developed to increase the color reproducibility of the above-mentioned digital devices, which utilize the YCbCr signal system. These methods include, for example, using a backlight assembly having light-emitting diodes (LED), changing the wavelength range of a cold cathode fluorescent lamp (CCFL), 12-bit driving of a display panel, or using a multi-primary color filter.

For example, the multi-primary color filter method may utilize a multi-primary color filter, which has at least four primary colors. Examples of multi-primary color filters which may be used in the above-mentioned primary color filter method are a color filter having red, green, blue and white (RGBW) colors, a color filter having red, green, blue, cyan and yellow (RGBCY) colors, a color filter having red, green, blue, cyan, magenta and yellow (RGBCMY) colors.

However, to manufacture the multi-primary color filter, additional processes and materials may also be required, which in turn may increase the cost and complexity of manufacturing the multi-primary color filter.

To decrease the amount of additional processes for forming the multi-primary color filter, a subtractive color mixing method for forming the RGB color using cyan, magenta and yellow (CMY) colors has been developed. However, in the subtractive color mixing method, the color filters may have different thicknesses from each other. Therefore, a stepped portion may be generated in a color filter substrate with multiple color filter layers, resulting in a non-uniform thickness.

For example, with the above-mentioned substractive color mixing method, a red color filter is formed by laminating a cyan color filter layer with a yellow color filter layer, and a green color filter is formed by laminating a yellow color filter layer with a magenta color filter layer. In addition, a blue color filter is formed by laminating a cyan color filter layer with a magenta color filter layer. Therefore, each of the cyan, magenta and yellow color filters has a thinner thickness than each of the red, green and blue color filters formed by the lamination of the cyan, magenta and yellow color filter layers. Consequently, a liquid crystal layer formed between a color filter substrate and an array substrate may have a non-uniform thickness.

Furthermore, with the subtractive color mixing method, the luminance of light penetrating the color filter layers may decrease as the number of the laminated color filter layers is increased.

Thus, there is a need for color filter substrate, which provides a display apparatus having this color filter substrate with improved image display quality and which is simpler to manufacture in comparison to conventional color filter substrates.

SUMMARY OF THE INVENTION

According to an exemplary embodiment of the present invention a color filter substrate is provided. The color filter substrate includes a base substrate, a first color filter and a second color filter. The base substrate includes a first pixel region and a second pixel region. The second pixel region includes a first sub-region and a second sub-region. The first color filter is formed in the first pixel region and the first sub-region of the second pixel region. Moreover, the second color filter is formed in the second sub-region of the second pixel region.

The first color filter may include a red color, a green color or a blue color.

The color filter substrate may further include a plurality of first pixel regions and a plurality of first color filters. The first pixel regions may include a red pixel region, a green pixel region and a blue pixel region. The first color filters may include a red color filter formed in the red pixel region, a green color filter formed in the green pixel region and a blue color filter formed in the blue pixel region.

The color filter substrate may further include a plurality of second pixel regions and a plurality of second color filters. The second pixel regions may include a cyan pixel region, a magenta pixel region and a yellow pixel region. The second color filters may include a blue color filter formed in a first sub-region of the cyan pixel region and a second sub-region of the magenta pixel region, a green color filter formed in a second sub-region of the cyan pixel region and a second sub-region of the yellow pixel region, and a red color filter formed in a first sub-region of the magenta pixel region and a first sub-region of the yellow pixel region.

The area of the first sub-region may be substantially equal to the area of the second sub-region.

Alternatively, the area of the first sub-region may be different from the area of the second sub-region.

The second pixel region may include a third sub-region disposed between the first sub-region and the second sub-region.

A boundary between the first and second sub-regions may be formed in a horizontal direction of the second pixel region.

A boundary between the first and second sub-regions may be formed in a vertical direction of the second pixel region.

A boundary between the first and second sub-regions may have a mesh shape.

The first sub-region and the second sub-region each may be in the form of a plurality of dot shapes. Alternatively, the dot shapes of the first and second sub-regions may be alternately arranged.

According to exemplary embodiment of the present invention, a color filter substrate is provided. The color filter substrate includes a base substrate, a red color filter, a green color filter and a blue color filter. The base substrate includes a red pixel region, a green pixel region, a blue pixel region and a color-mixing pixel region that includes a first sub-region and a second sub-region. The red color filter is formed in the red pixel region. The green color filter is formed in the green pixel region. The blue color filter is formed in the blue pixel region. In addition, a first color filter selected from a red color filter, a green color filter or a blue color filter is formed in the first sub-region. Moreover, a second color filter, differing from the first color filter and selected from a red color filter, a green color filter or a blue color filter, is formed in the second sub-region.

According to an exemplary embodiment of the present invention, a method of manufacturing a color filter substrate is provided. The method includes forming a black matrix including a plurality of openings that expose the first and second pixel regions in a base substrate having a first pixel region and a second pixel region that includes a first sub-region and a second sub-region, forming a first color filter in the first pixel region and the first sub-region of the second pixel region, and forming a second color filter in the second sub-region of the second pixel region. The first and second pixel regions are exposed through the plurality of openings.

The first and second color filters may each include a red color filter, a green color filter or a blue color filter.

According to another exemplary embodiment of the present invention, a display apparatus is provided. The display apparatus includes a base substrate, a light-emitting element, a first color filter and a second color filter. The base substrate includes a first pixel region and a second pixel region that includes a first sub-region and a second sub-region. The light-emitting element is formed in the first and second pixel regions of the base substrate. The first color filter is formed in the first pixel region and the first sub-region of the second pixel region. The second color filter is formed in the second sub-region of the second pixel region.

The light-emitting element may include a first electrode, a second electrode facing the first electrode and an organic light-emitting element disposed between the first electrode and the second electrode.

According to another exemplary embodiment of the present invention, a display apparatus is provided. The display apparatus includes a color filter substrate, an array substrate and a liquid crystal layer. The color filter substrate includes a base substrate, a first color filter and a second color filter. The base substrate includes a first pixel region and a second pixel region that has a first sub-region and a second sub-region. The first color filter is formed in the first pixel region and the first sub-region of the second pixel region. The second color filter is formed in the second sub-region of the second pixel region. The array substrate faces the color filter substrate, and includes a pixel electrode and a switching device that applies a pixel voltage to the pixel electrode. The liquid crystal layer is disposed between the array substrate and the color filter substrate.

According to exemplary embodiments of the present invention, different colors are mixed to form the color filter substrate through an additive color mixing method such that the luminance of the display apparatus may be improved.

BRIEF DESCRIPTION OF THE DRAWINGS

Exemplary embodiments of the present invention can be understood in more detail from the following description taken in conjunction with the accompanying drawings, in which.

DETAILED DESCRIPTION OF THE EXEMPLARY EMBODIMENTS

Figure 1A:
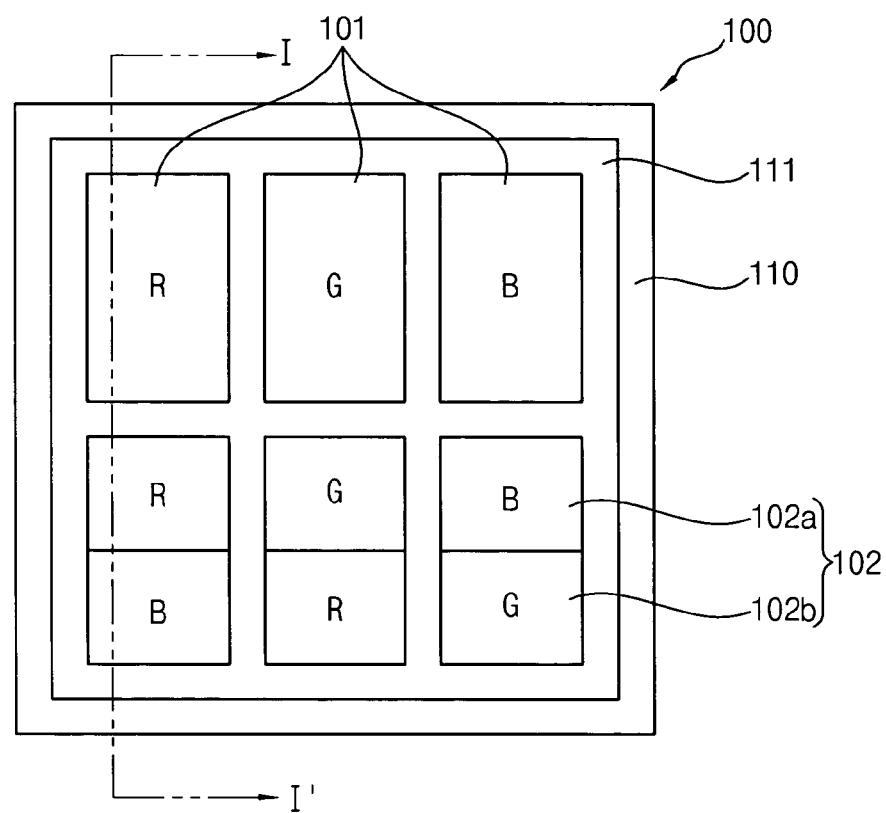
FIG. 1A is a plan view illustrating a pixel region of a color filter substrate according to an exemplary embodiment of present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1B:
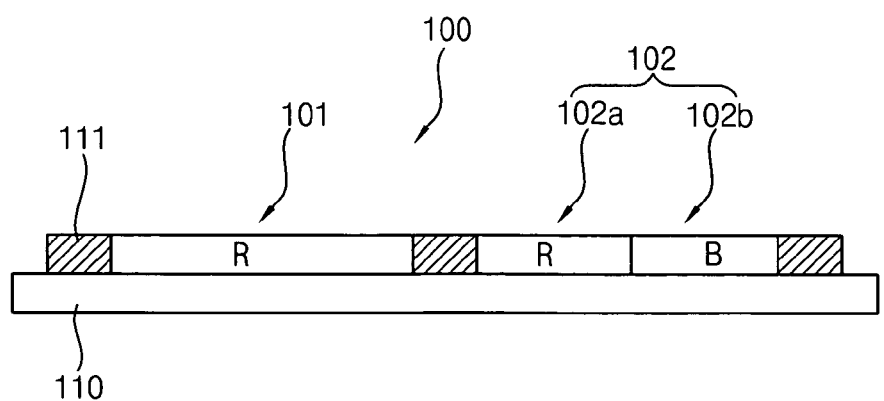
FIG. 1B is a cross-sectional view taken along a line I-I' in FIG. 1A.

FIG. 1A is a plan view illustrating a pixel region of a color filter substrate according to an exemplary embodiment of present invention. FIG. 1B is a cross-sectional view taken along a line I-I' in FIG. 1A.

Referring to FIGS. 1A and 1B, a color filter substrate 100 includes a base substrate 110 and a plurality of color filters formed on the base substrate 110. Alternatively, the color filter substrate 100 may further include a black matrix 111.

The base substrate 110 includes an optically transparent material. For example, the optically transparent material that may be used for the base substrate 110 may include glass, quartz, or a synthetic resin.

The black matrix 111 is formed on the base substrate 110. The black matrix 111 blocks light. The black matrix 111 includes a plurality of openings arranged in a matrix shape. The base substrate 110 is partially exposed through the openings. The openings define a plurality of pixel regions on the base substrate 110.

Each of the pixel regions includes a first pixel region 101 and a second pixel region 102. The second pixel region 102 includes a first sub-region 102a and a second sub-region 102b.

The first pixel region 101 includes a red pixel region R, a green pixel region G and a blue pixel region B. The second pixel region 102 includes a cyan pixel region, a magenta pixel region and a yellow pixel region.

The cyan pixel region, the magenta pixel region and the yellow pixel region are each formed through an additive color mixing technique. For example, a cyan color is generated through a summation of light having a wavelength that corresponds to a blue color and light having a wavelength that corresponds to a green color (C=B+G), and a magenta color is embodied through a summation of light having a wavelength that corresponds to a red color and light having a wavelength that corresponds to the blue color (M=R+B). In addition, a yellow color is embodied through a summation of light having a wavelength that corresponds to the red color and light having a wavelength that corresponds to the green color (Y=R+G).

Therefore, the second pixel region 102 corresponding to each of the cyan pixel region, the magenta pixel region and the yellow pixel region includes the first sub-region 102a and the second sub-region 102b. A first color filter, which may include a red color filter, a green color filter and a blue color filter, is formed in the first sub-region 102a. In addition, a second color filter, differing from the first color filter and which may include a red color filter, a green color or blue color filter, is formed in the second sub-region 102b. The combination of the two different color filters in the first and second sub-regions 102a and 102b each form a cyan color filter, a magenta color filter and a yellow color filter in the second pixel region 102.

The area of the first sub-region 102a may be substantially equal to the area of the second sub-region 102b. Alternatively, the area of the first sub-region 102a may be different from the area of the second sub-region 102b.

In FIGS. 1A and 1B, a boundary between the first sub-region 102a and the second sub-region 102b is formed along a horizontal direction of the second pixel region 102. When the boundary between the first and second sub-regions is formed along the horizontal direction of the second pixel region, the color filter substrate may be easier to manufacture than a color filter substrate having a boundary formed along a vertical direction.

Figure 2:
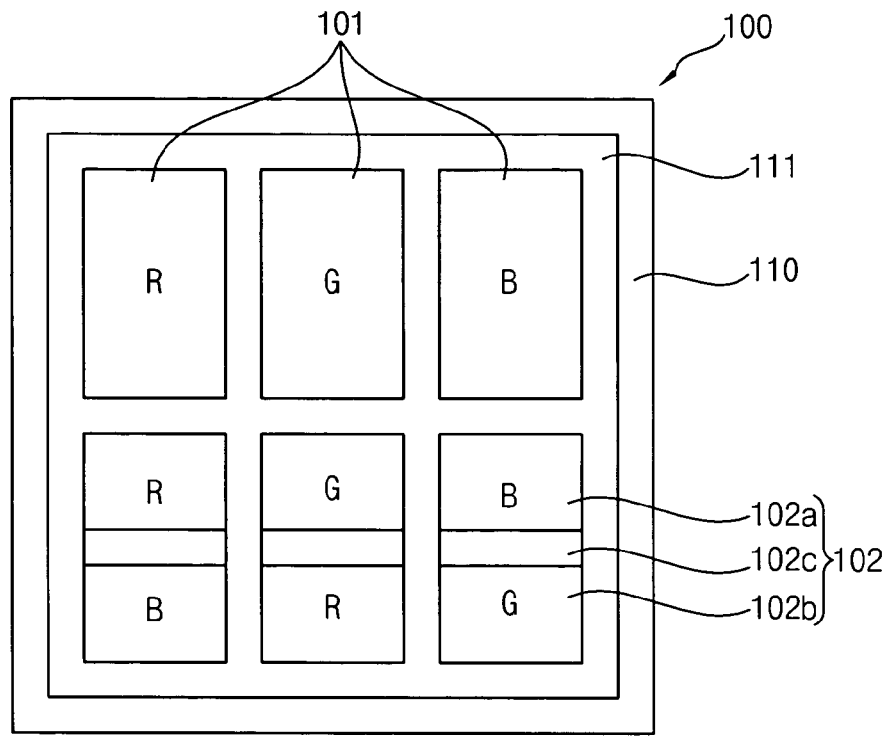
FIG. 2 is a plan view illustrating a pixel region of a color filter substrate according to an exemplary embodiment of present invention.

FIG. 2 is a plan view illustrating a pixel region of a color filter substrate according to an exemplary embodiment of present invention. A color filter substrate of FIG. 2 is substantially the same as the embodiment of FIGS. 1A and 1B except for a second pixel region. Thus, the same reference numerals will be used to refer to the same or like parts as those described in FIGS. 1A and 1B and any further repetitive explanation concerning the above elements will be omitted.

Referring to FIG. 2, the color filter substrate 100 includes a base substrate 110 and a plurality of color filters formed on the base substrate 110. Alternatively, the color filter substrate 100 may further include a black matrix 111 defining a plurality of pixel regions. The pixel regions are arranged in a matrix shape over the color filter substrate 100. Each of the pixel regions includes a first pixel region 101 and a second pixel region 102.

The second pixel region 102 includes a first sub-region 102a, a second sub-region 102b and a third sub-region 102c. Boundaries between the first sub-region 102a, the second sub-region 102b and the third sub-region 102c are formed along a horizontal direction of the second pixel region 102.

A first color filter, which may include a red color filter, a green color filter or a blue color filter, is formed in the first sub-region 102a. Additionally, a second color filter, differing from the first color filter and which may include a red color filter, a green color filter or a blue color filter, is formed in the second sub-region 102b.

The third sub-region 102c is disposed between the first sub-region 102a and the second sub-region 102b. The two different color filters formed in the first sub-region 102a and the second sub-region 102b are spaced apart from each other by the third sub-region 102c. The third sub-region 102c prevents overlapping between the two color filters formed in the first sub-region 102a and the second sub-region 102b so that a stepped portion is not formed between the two color filters formed in the first and second sub-regions 102a and 102ba. In addition, the size of the third sub-region 102c is adjusted to control color coordinates of light passing through the second pixel region 102.

Figure 3:
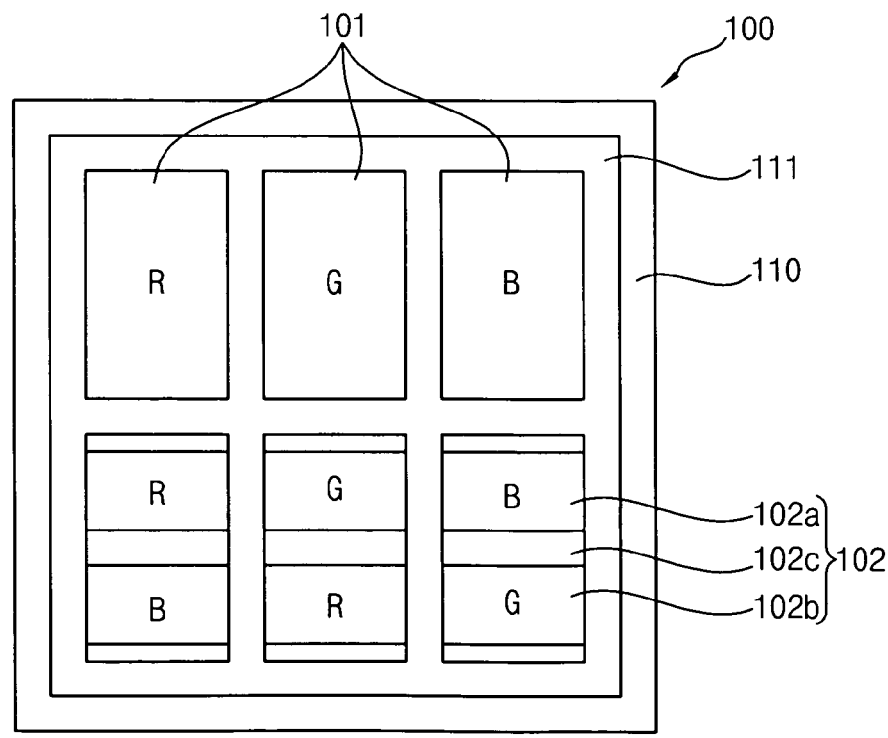
FIG. 3 is a plan view illustrating a pixel region of a color filter substrate according to an exemplary embodiment of present invention.

FIG. 3 is a plan view illustrating a pixel region of a color filter substrate according to an exemplary embodiment of present invention. A color filter substrate of FIG. 3 is substantially the same as the embodiment of FIGS. 1A and 1B except for a second pixel region. Thus, the same reference numerals will be used to refer to the same or like parts as those described in FIGS. 1A and 1B and any further repetitive explanation concerning the above elements will be omitted.

Referring to FIG. 3, the color filter substrate 100 includes a base substrate 110 and a plurality of color filters formed on the base substrate 110. Alternatively, the color filter substrate 100 may further include a black matrix 111 defining a plurality of pixel regions. The pixel regions are arranged in a matrix shape. Each of the pixel regions includes a first pixel region 101 and a second pixel region 102.

The second pixel region 102 includes a first pixel region 102a, a second pixel region 102b and a third pixel region 102c. Boundaries between the first sub-region 102a, the second sub-region 102b and the third sub-region 102c are formed along a horizontal direction of the second pixel region 102.

A first color filter, which may include a red color filter, a green color filter or blue color filter, is formed in the first sub-region 102a. Moreover, a second color filter, differing from the first color filter and which may include a red color filter, a green color filter or a blue color filter, is formed in the second sub-region 102b.

The third sub-region 102c is disposed at edge portions of and between the first sub-region 102a and the second sub-region 102b in the horizontal direction. The two color filters formed in the first sub-region 102a and the second sub-region 102b are spaced apart from each other by the third sub-region 102c. The third sub-region 102c prevents overlapping between the two color filters formed in the first sub-region 102a and the second sub-region 102b so that a stepped portion is not formed between the two color filters formed in the first and second sub-regions 102a and 102b. In addition, the size of the third sub-region 102c is adjusted to control color coordinates of light passing through the second pixel region 102.

Figure 4:
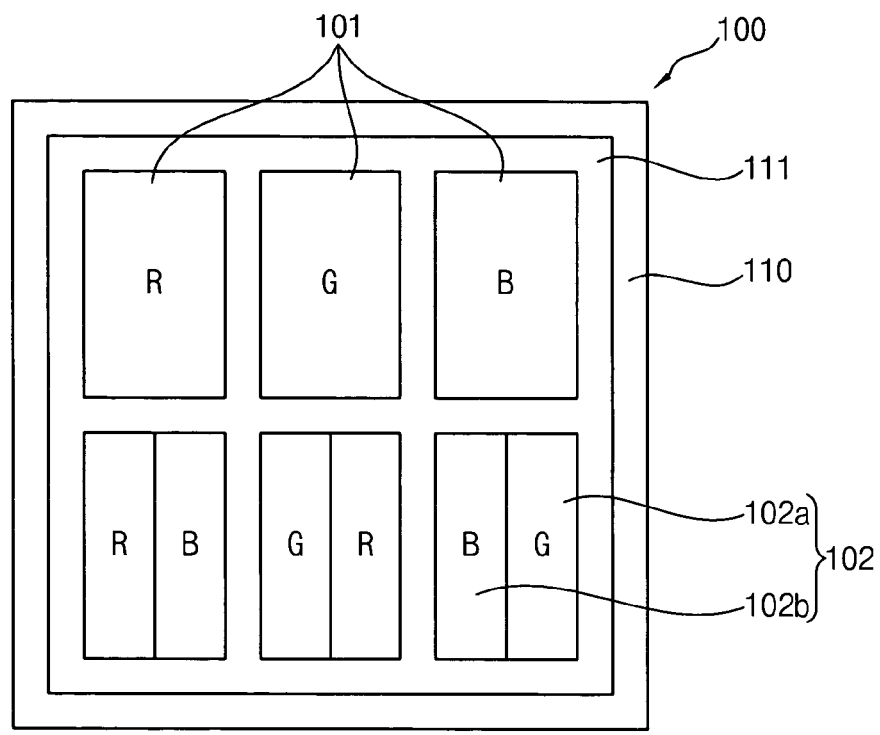
FIG. 4 is a plan view illustrating a pixel region of a color filter substrate according to an exemplary embodiment of present invention.

FIG. 4 is a plan view illustrating a pixel region of a color filter substrate according to an exemplary embodiment of present invention. The color filter substrate of FIG. 4 is substantially the same as the embodiment of FIGS. 1A and 1B except for a second pixel region. Thus, the same reference numerals will be used to refer to the same or like parts as those described in FIGS. 1A and 1B and any further repetitive explanation concerning the above elements will be omitted.

Referring to FIG. 4, the color filter substrate 100 includes a base substrate 110 and a plurality of color filters formed on the base substrate 110. Alternatively, the color filter substrate 100 may further include a black matrix 111 defining a plurality of pixel regions. The pixel regions are arranged in a matrix shape. Each of the pixel regions includes a first pixel region 101 and a second pixel region 102.

The second pixel region 102 includes a first sub-region 102a and a second sub-region 102b. A first color filter, which may include a red color filter, a green color filter or a blue color filter, is formed in the first sub-region 102a. Additionally, a second color filter, differing color from the first color filter and which may include a red color filter, a green color filter or a blue color filter, is formed in the second sub-region 102b. The combination of the two different color filters of first and second sub-regions 102a and 102b each form a cyan color filter, a magenta color filter and a yellow color filter in the second pixel region 102.

The area of the first sub-region 102a may be substantially equal to the area of the second sub-region 102b. Alternatively, the area of the first sub-region 102a may be different from the area of the second sub-region 102b.

In FIG. 4, a boundary between the first sub-region 102a and the second sub-region 102b is formed along a vertical direction of the second pixel region 102. When the boundary between the first sub-region 102a and the second sub-region 102b is formed along the vertical direction of the second pixel region 102, the size of the boundary between the first sub-region 102a and the second sub-region 102b is increased. Therefore, the colors in the first and second sub-regions 102a and 102b may be readily mixed to form each of the cyan, magenta and yellow colors.

Figure 5:
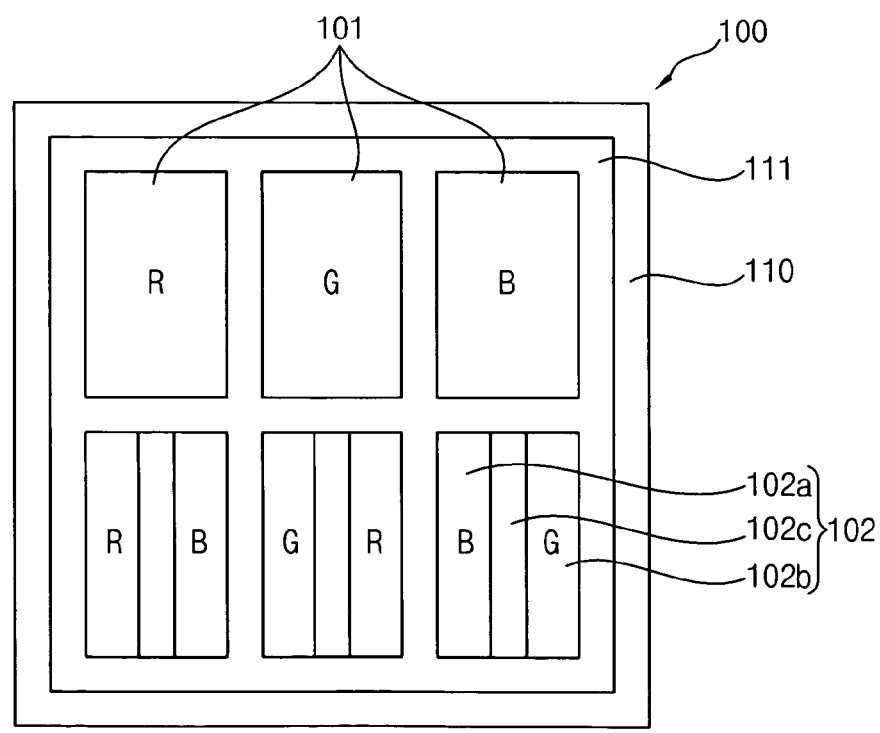
FIG. 5 is a plan view illustrating a pixel region of a color filter substrate according to an exemplary embodiment of present invention.

FIG. 5 is a plan view illustrating a pixel region of a color filter substrate according to an exemplary embodiment of present invention. A color filter substrate of FIG. 5 is substantially the same as the embodiment of FIGS. 1A and 1B except for a second pixel region. Thus, the same reference numerals will be used to refer to the same or like parts as those described in FIGS. 1A and 1B and any further repetitive explanation concerning the above elements will be omitted.

Referring to FIG. 5, the color filter substrate 100 includes a base substrate 110 and a plurality of color filters formed on the base substrate 110. Alternatively, the color filter substrate 100 may further include a black matrix 111 defining a plurality of pixel regions. The pixel regions are arranged in a matrix shape. Each of pixel the regions includes a first pixel region 101 and a second pixel region 102.

The second pixel region 102 includes a first sub-region 102a, a second sub-region 102b and a third sub-region 102c. A boundary between the first sub-region 102a, the second sub-region 102b and the third sub-region 102c is formed along a vertical direction of the second pixel region 102.

A first color filter, which may include a red color filter, a green color filter or a blue color filter, is formed in the first sub-region 102a. In addition, a second color filter, differing from the first color filter and which may include a red color filter, a green color filter or a blue color filter, is formed in the second sub-region 102b.

The third sub-region 102c is disposed between the first sub-region 102a and the second sub-region 102b. The two different color filters formed in the first sub-region 102a and the second sub-region 102b are spaced apart from each other by the third sub-region 102c. The third sub-region 102c prevents overlapping between the two color filters formed in the first sub-region 102a and the second sub-region 102b so that a stepped portion is not formed between the two color filters formed in the first and second sub-regions 102a and 102b. In addition, the size of the third sub-region 102c is adjusted to control color coordinates of light passing through the second pixel region 102.

Figure 6:
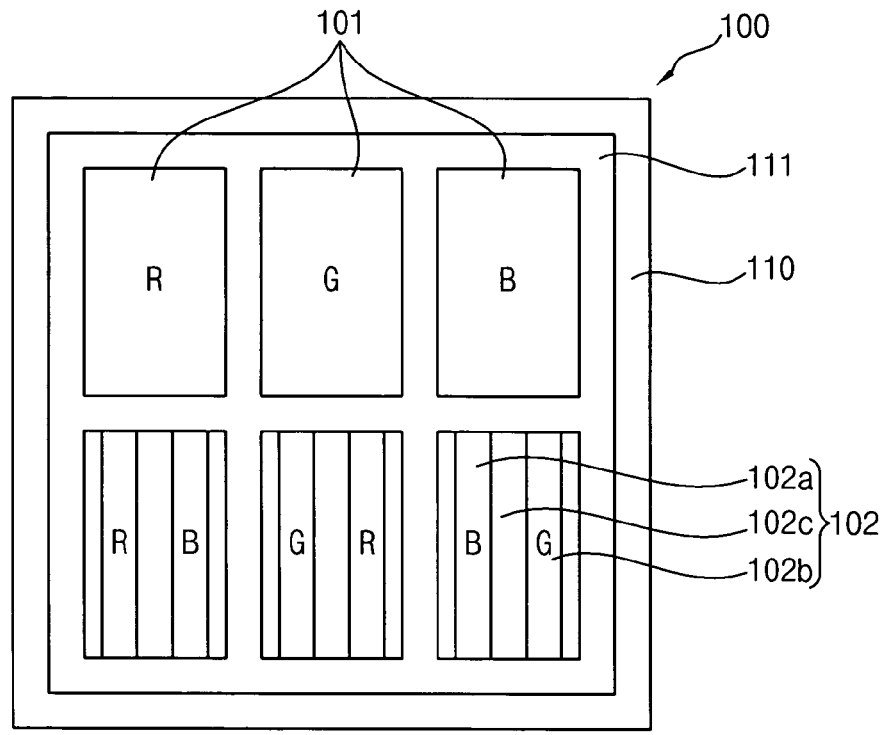
FIG. 6 is a plan view illustrating a pixel region of a color filter substrate according to an exemplary embodiment of present invention.

FIG. 6 is a plan view illustrating a pixel region of a color filter substrate according to an exemplary embodiment of present invention. A color filter substrate of FIG. 6 is substantially the same the embodiment of FIGS. 1A and 1B except for a second pixel region. Thus, the same reference numerals will be used to refer to the same or like parts as those described in FIGS. 1A and 1B and any further repetitive explanation concerning the above elements will be omitted.

Referring to FIG. 6, the color filter substrate 100 includes a base substrate 110 and a plurality of color filters formed on the base substrate 110. Alternatively, the color filter substrate 100 may further include a black matrix 111 defining a plurality of pixel regions. The pixel regions are arranged in a matrix shape. Each of the pixel regions includes a first pixel region 101 and second pixel region 102.

The second pixel region 102 includes a first sub-region 102a, a second sub-region 102b and a third sub-region 102c. A boundary between the first sub-region 102a, the second sub-region 102b and the third sub-region 102c is formed along a horizontal direction of the second pixel region 102.

A first color filter, which may include a red color filter, a green color filter or a blue color filter, is formed in the first sub-region 102a. Moreover, a second color filter, differing from the first color filter and which may include a red color filter, a green color filter or a blue color filter, is formed in the second sub-region 102b.

The third sub-region 102c is disposed at edge portions of and between the first sub-region 102a and the second sub-region 102b in the horizontal direction. The two color filters formed in the first sub-region 102a and the second sub-region 102b are spaced apart from each other by the third sub-region 102c. The third sub-region 102c prevents overlapping between the two color filters formed in the first sub-region 102a and the second sub-region 102b so that a stepped portion is not formed between the two color filters formed in the first and second sub-regions 102a and 102b. In addition, the size of the third sub-region 102c is adjusted to control color coordinates of light having passed through the second pixel region 102.

Figure 7:
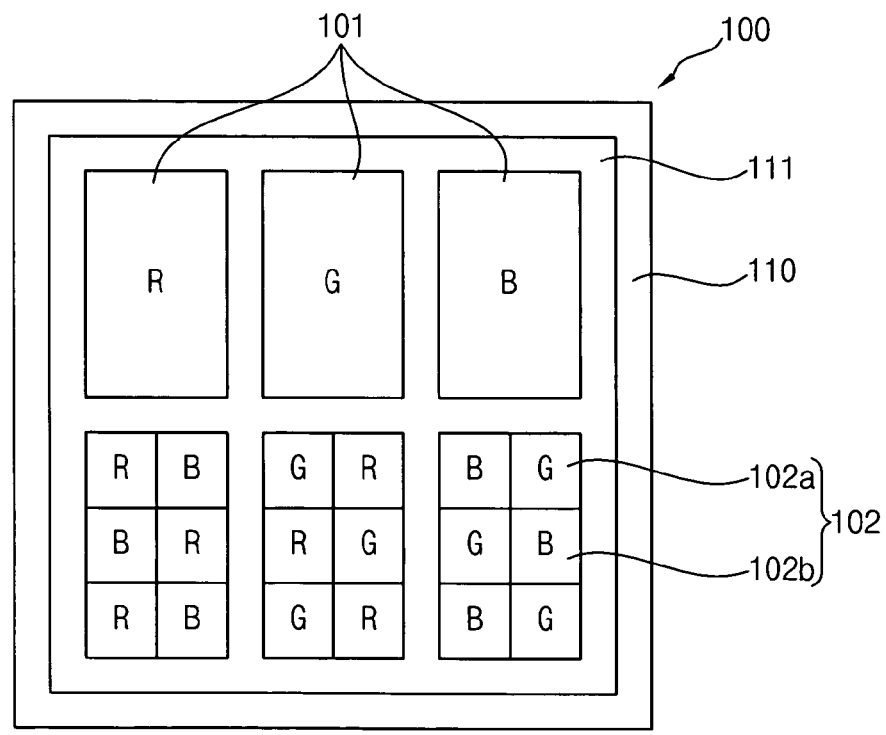
FIG. 7 is a plan view illustrating a pixel region of a color filter substrate according to an exemplary embodiment of present invention.

FIG. 7 is a plan view illustrating a pixel region of a color filter substrate according to an exemplary embodiment of present invention. A color filter substrate of FIG. 7 is substantially the same as the embodiment of FIGS. 1A and 1B except for a second pixel region. Thus, the same reference numerals will be used to refer to the same or like parts as those described in FIGS. 1A and 1B and any further repetitive explanation concerning the above elements will be omitted.

Referring to FIG. 7, the color filter substrate 100 includes a base substrate 110 and a plurality of color filters formed on the base substrate 110. Alternatively, the color filter substrate 100 may further include a black matrix 111 defining a plurality of pixel regions. The pixel regions are arranged in a matrix shape. Each of the pixel regions includes a first pixel region 101 and a second pixel region 102.

The second pixel region 102 includes a first sub-region 102a and a second sub-region 102b. A first color filter, which may include a red color filter, a green color filter or a blue color filter, is formed in the first sub-region 102a. Additionally, a second color filter, differing from the first color filter and which may include a red color filter, a green color filter or a blue color filter, is formed in the second sub-region 102b. The combination of the two different color filters in the first and second sub-regions 102a and 102b each form a cyan color filter, a magenta color filter and a yellow color filter in the second pixel region 102.

The area of the first sub-region 102a may be substantially equal to the area of the second sub-region 102b according to the color coordinates. Alternatively, the area of the first sub-region 102a may be different from the area of the second sub-region 102b according to the color coordinates.

In FIG. 7, a boundary between the first sub-region 102a and the second sub-region 102b has a mesh shape. That is, the first sub-region 102a and the second sub-region 102b are arranged in a substantially checkered shape.

When a boundary between the first sub-region 102a and the second sub-region 102b is formed in the mesh shape, the size of the boundary between the first sub-region 102a and the second sub-region 102b may be increased. Therefore, the colors in the first and second sub-regions 102a and 102b may be readily mixed to form each of the cyan, magenta and yellow colors.

Figure 8:
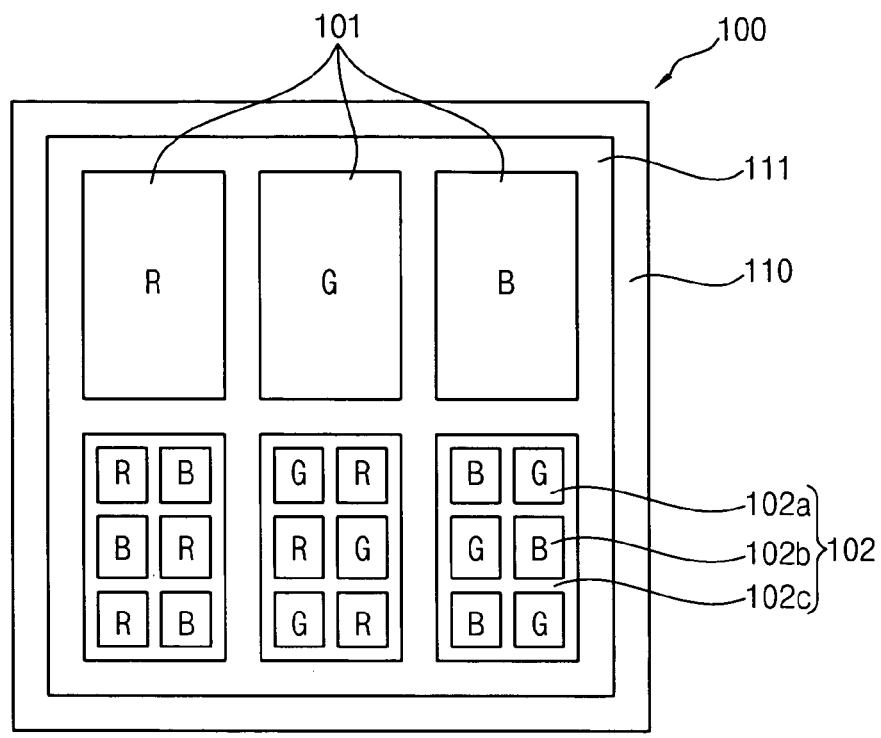
FIG. 8 is a plan view illustrating a pixel region of a color filter substrate according to an exemplary embodiment of present invention.

FIG. 8 is a plan view illustrating a pixel region of a color filter substrate according to an exemplary embodiment of present invention. A color filter substrate of FIG. 8 is substantially the same as the embodiment of FIG. 7 except for a second pixel region. Thus, the same reference numerals will be used to refer to the same or like parts as those described in FIG. 7 and any further repetitive explanation concerning the above elements will be omitted.

Referring to FIG. 8, the color filter substrate 100 includes a base substrate 110 and a plurality of color filters formed on the base substrate 110. Alternatively, the color filter substrate 100 may further include a black matrix 111 defining a plurality of pixel regions. The pixel regions are arranged in a matrix shape on the color filter substrate 100. Each of the pixel regions includes a first pixel region 101 and a second pixel region 102.

The second pixel region 102 includes a first sub-region 102a, a second sub-region 102b and a third sub-region 102c. A first color filter, which may include a red color filter, a green color filter or a blue color filter, is formed in the first sub-region 102a. Additionally, a second color, differing from the first color filter and which may include a red color filter, a green color filter or a blue color filter, is formed in the second sub-region 102*b*.

The third sub-region 102*c* is formed adjacent to sides of the first sub-region 102*a* and the second sub-region 102*b*. That is, the first sub-region 102*a* and the second sub-region 102*b* are arranged in a matrix shape according to the shape of the third sub-region 102*c*.

The two color filters formed in the first sub-region 102*a* and the second sub-region 102*b* are spaced apart from each other by the third sub-region 102*c*. The third sub-region 102*c* prevents overlapping between the two color filters formed in the first sub-region 102*a* and the second sub-region 102*b* so that a stepped portion is not formed between the two color filters formed in the first and second sub-regions 102*a* and 102*b*. In addition, the size of the third sub-region 102*c* is adjusted to control color coordinates of light passing through the second pixel region 102.

Figure 9:
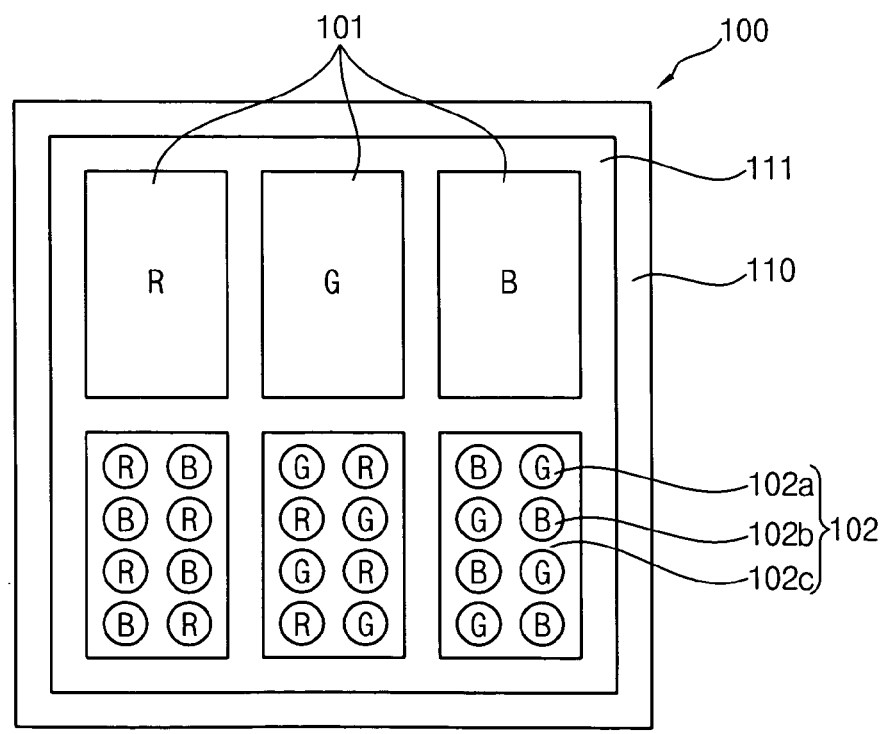
FIG. 9 is a plan view illustrating a pixel region of a color filter substrate according to an exemplary embodiment of present invention.

FIG. 9 is a plan view illustrating a pixel region of a color filter substrate according to an exemplary embodiment of present invention. A color filter substrate of FIG. 9 is substantially the same as the embodiment of FIG. 7 except for a second pixel region. Thus, the same reference numerals will be used to refer to the same or like parts as those described in FIG. 7 and any further repetitive explanation concerning the above elements will be omitted.

Referring to FIG. 9, the color filter substrate 100 includes a base substrate 110 and a plurality of color filters formed on the base substrate 110. Alternatively, the color filter substrate 100 may further include a black matrix 111 defining a plurality of pixel regions. The pixel regions are arranged in a matrix shape. Each of the pixel regions includes a first pixel region 101 and a second pixel region 102.

The second pixel region 102 includes a first sub-region 102*a*, a second sub-region 102*b* and a third sub-region 102*c*. A first color filter, which may include a red color filter, a green color filter or a blue color filter, is formed in the first sub-region 102*a*. Moreover, a second color filter, differing from the first color filter and which may include a red color filter, a green color filter or a blue color filter, is formed in the second sub-region 102*b*.

The first sub-region 102*a* and the second sub-region 102*b* may each have a plurality of dot shapes. In FIG. 9, the first and second sub-regions 102*a* and 102*b* may each have a plurality of substantially circular shapes. The third sub-region 102*c* defines a matrix shape so that the first and second sub-regions 102*a* and 102*b* are arranged in the matrix shape. For example, the first sub-region 102*a* and the second sub-region 102*b* may be arranged in a pattern in which the positioning of the first sub-region 102*a* relative to the second sub-region 102*b* alternates throughout the pattern to form the matrix shape.

The two color filters formed in the first sub-region 102*a* and the second sub-region 102*b* are spaced apart from each other by the third sub-region 102*c*. The third sub-region 102*c* prevents overlapping between the two color filters formed in the first sub-region 102*a* and the second sub-region 102*b* so that a stepped portion is not formed between the two color filters formed in the first and second sub-regions 102*a* and 102*b*. In addition, the size of the third sub-region 102*c* is adjusted to control color coordinates of light passing through the second pixel region 102.

Figure 10:
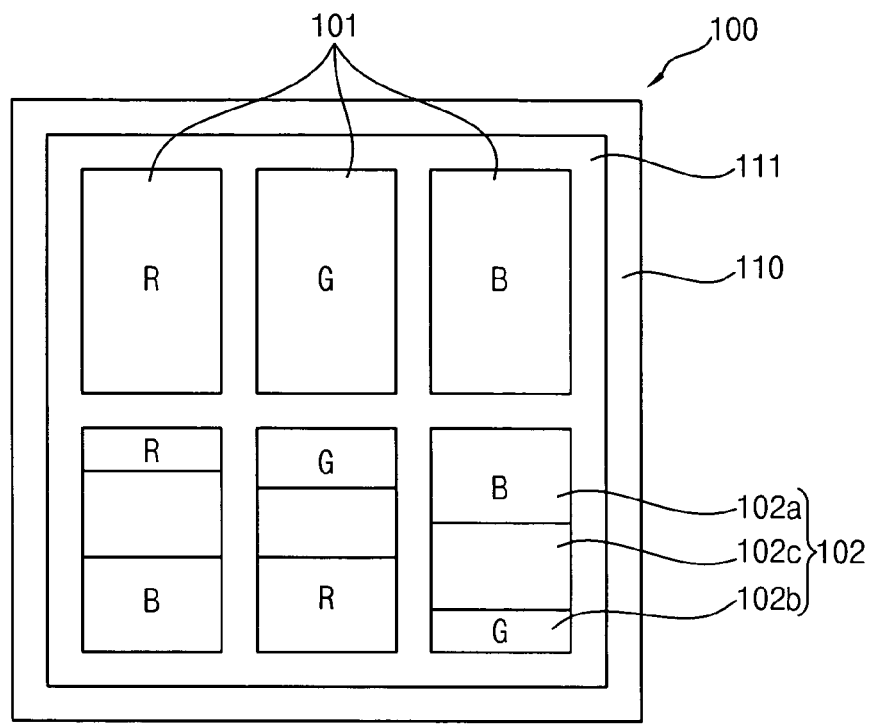
FIG. 10 is a plan view illustrating a pixel region of a color filter substrate according to an exemplary embodiment of present invention.

FIG. 10 is a plan view illustrating a pixel region of a color filter substrate according to an exemplary embodiment of present invention. A color filter substrate of FIG. 10 is substantially the same as the embodiment of FIG. 7 except for a second pixel region. Thus, the same reference numerals will be used to refer to the same or like parts as those described in FIG. 7 and any further repetitive explanation concerning the above elements will be omitted.

Referring to FIG. 10, the color filter substrate 100 includes a base substrate 110 and a plurality of color filters formed on the base substrate 110. Alternatively, the color filter substrate 100 may further include a black matrix 111 defining a plurality of pixel regions. The pixel regions are arranged in a matrix shape. Each of the pixel regions includes a first pixel region 101 and a second pixel region 102.

The second pixel region 102 includes a first sub-region 102*a*, a second sub-region 102*b* and a third sub-region 102*c*. Boundaries between the first sub-region 102*a*, the second sub-region 102*b* and the third sub-region 102*c* are formed along a horizontal direction of the second pixel region 102.

A first color filter, which may include a red color filter, a green color filter or a blue color filter, is formed in the first sub-region 102*a*. Also, a second color filter, differing from the first color filter and which may include a red color filter, a green color filter or a blue color filter, is formed in the second sub-region 102*b*.

The third sub-region 102*c* is disposed between the first sub-region 102*a* and the second sub-region 102*b*. The two color filters formed in the first sub-region 102*a* and the second sub-region 102*b* are spaced apart from each other by the third sub-region 102*c*. An area of the first sub-region 102*a* is different from an area of the second sub-region 102*b*. Alternatively, the first and second sub-regions 102*a* and 102*b* of the second pixel region 102 may have different areas from first and second sub-regions of an adjacent second pixel region.

The third sub-region 102*c* prevents overlapping between the color filters formed in the first sub-region 102*a* and the second sub-region 102*b* so that a stepped portion is not formed between the two color filters formed in the first and second sub-regions 102*a* and 102*b*. In addition, the size of the third sub-region 102*c* is adjusted to control color coordinates of light passing through the second pixel region 102.

Figure 11:
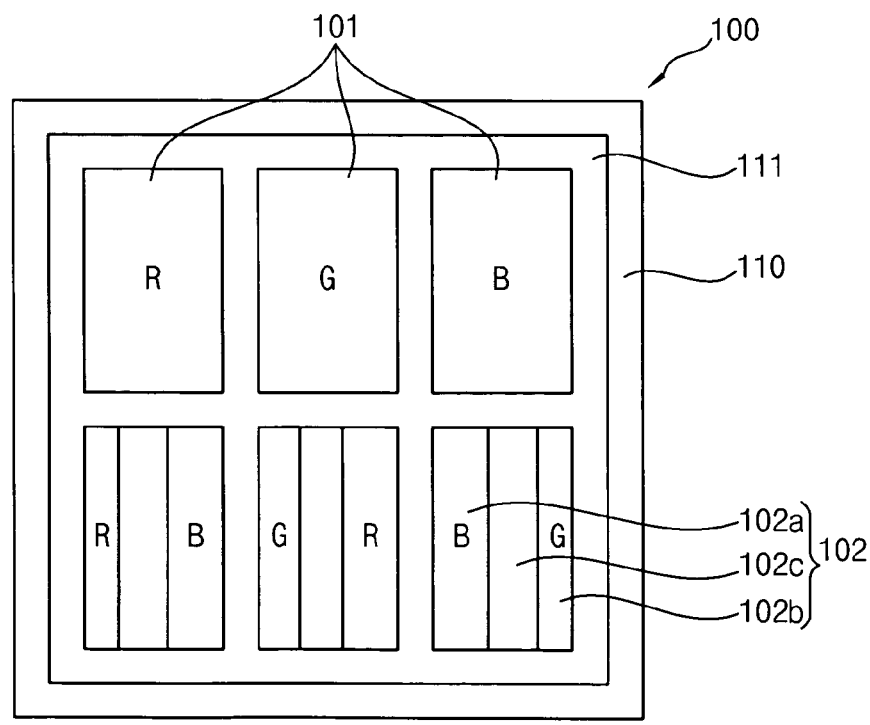
FIG. 11 is a plan view illustrating a pixel region of a color filter substrate according to an exemplary embodiment of present invention.

FIG. 11 is a plan view illustrating a pixel region of a color filter substrate according to an exemplary embodiment of present invention. The color filter substrate of FIG. 11 is substantially the same as the embodiment of FIG. 7 except for a second pixel region. Thus, the same reference numerals will be used to refer to the same or like parts as those described in FIG. 7 and any further repetitive explanation concerning the above elements will be omitted.

Referring to FIG. 11, the color filter substrate 100 includes a base substrate 110 and a plurality of color filters formed on the base substrate 110. Alternatively, the color filter substrate 100 may further include a black matrix 111 defining a plurality of pixel regions. The pixel regions are arranged in a matrix shape. Each of the pixel regions includes a first pixel region 101 and a second pixel region 102.

The second pixel region 102 includes a first sub-region 102*a*, a second sub-region 102*b* and a third sub-region 102*c*. A boundary between the first sub-region 102*a*, the second sub-region 102*b* and the third sub-region 102*c* is formed along vertical direction of the second pixel region 102.

A first color filter, which may include a red color filter, a green color filter or a blue color filter, is formed in the first sub-region 102*a*. Moreover, a second color filter, differing from the first color filter and which may include a red color filter, a green color filter or a blue color filter, is formed in the second sub-region 102*b*.

The third sub-region 102*c* is disposed between the first sub-region 102*a* and the second sub-region 102*b*. The two color filters formed in the first sub-region 102*a* and the second sub-region 102*b* are spaced apart from each other by the third sub-region 102*c*. The area of the first sub-region 102*a* is different from the area of the second sub-region 102b. Alternatively, the first and second sub-regions 102a and 102b of the second pixel region 102 may have different areas from first and second sub-regions of an adjacent second pixel region.

The third sub-region 102c prevents overlapping between the color filters formed in the first sub-region 102a and the second sub-region 102b so that a stepped portion is not formed between the two color filters formed in the first and second sub-regions 102a and 102b. In addition, the size of the third sub-region 102c is adjusted to control color coordinates of light having passed through the second pixel region 102.

Referring again to FIG. 1B, a method of manufacturing the color filter substrate in accordance with an exemplary embodiment of the invention is explained as follows.

The black matrix 111 including openings, through which the first pixel region 101 and the second pixel region 102 in the base substrate 110 are exposed, is formed over the base substrate 110.

For example, a black matrix layer is formed on the base substrate 110 to cover substantially the entire upper surface of the base substrate 110. In addition, a portion of the black matrix layer corresponding to the first pixel region 101 and the second pixel region 102 is partially removed to form the openings. Alternatively, the black matrix layer may be selectively formed on the base substrate 110 in regions except for the first pixel region 101 and the second pixel region 102.

A red color filter, a green color filter and a blue color filter are formed in the first pixel region 101 and the first sub-region of the second pixel region 102, in sequence. A cyan color filter, a magenta color filter and a yellow color filter may be formed from substantially the same layers as the red color filter, the green color filter and the blue color filter. That is, the cyan color filter, the magenta color filter and the yellow color filter may be simultaneously formed with the red color filter, the green color filter and the blue color filter.

Figure 12:
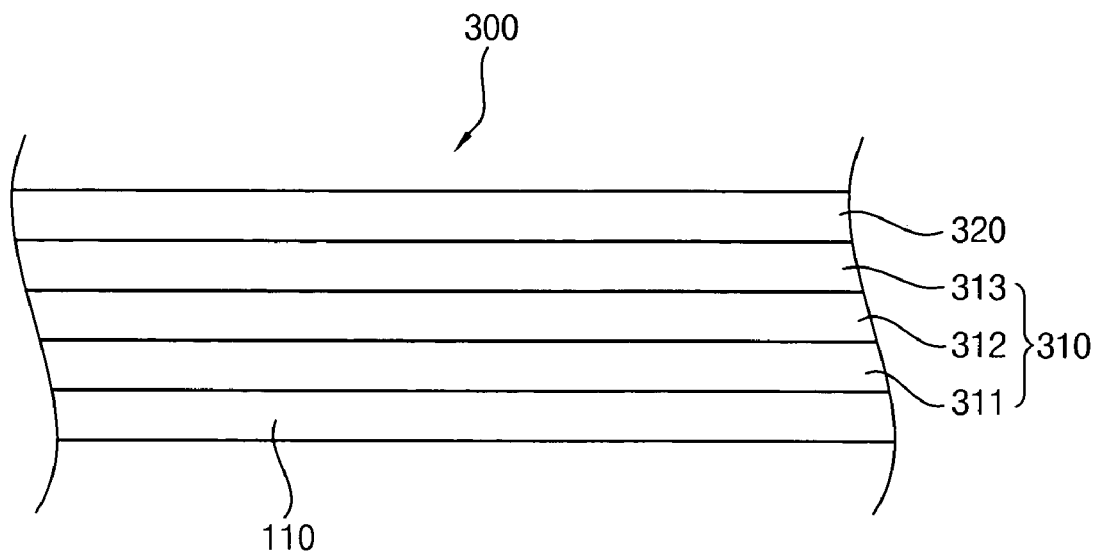
FIG. 12 is a cross-sectional view illustrating a display apparatus according to an exemplary embodiment of present invention.

FIG. 12 is a cross-sectional view illustrating a display apparatus according to exemplary embodiment of present invention.

Referring to FIG. 12, a display apparatus includes a base substrate 110, a plurality of organic light-emitting elements 310 formed on the base substrate 110, and a color filter layer 320 formed on the organic light-emitting element 310.

The organic light-emitting elements 310 are arranged in a matrix shape on the base substrate 110, and generate white light. Each of the organic light-emitting elements 310 includes a first electrode 311, a second electrode 313 and an organic light-emitting layer 312. The first electrode 311 is formed on the base substrate 110, and is arranged in the matrix shape. The organic light-emitting layer 312 is formed on the first electrode 311. The second electrode 313 is formed on the organic light-emitting layer 312.

The first electrode 311 may include, for example, a metal. The second electrode 313 may include, for example, optically transparent and electrically conductive material. For example, the optically transparent and electrically conductive material that may be used for the second electrode 313 may include indium tin oxide (ITO) or indium zinc oxide (IZO). The organic light-emitting layer 312 is disposed between the first electrode 311 and the second electrode 313.

When a voltage is applied to the first electrode 311 and the second electrode 313, a positive charge and a negative charge are generated from the first and second electrodes 311 and 313, respectively. Alternatively, the positive charge and the negative charge may be generated from the second and first electrodes 313 and 311, respectively. When the positive charge is combined with the negative charge in the organic light-emitting layer 312, white light is generated. The white light passes through the second electrode 313 and the color filter layer 320 to display color.

The arrangement of the color filter layer 320 is substantially equal to the arrangement of a color filter layer shown in FIGS. 1 to 11. Thus, any further repetitive explanation concerning the above elements will be omitted.

Figure 13:
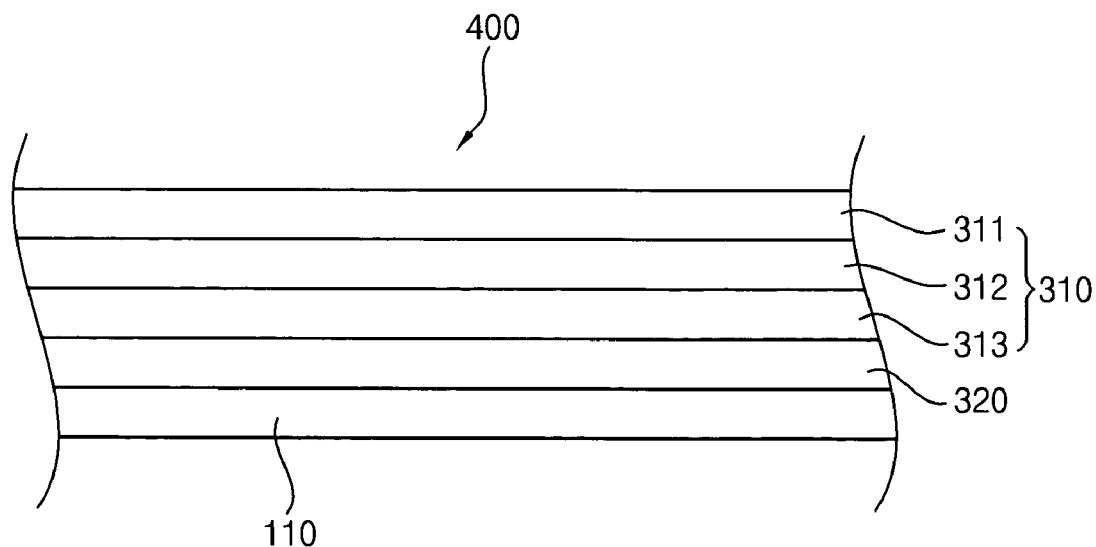
FIG. 13 is a cross-sectional view illustrating a display apparatus according to an exemplary embodiment of present invention.

FIG. 13 is a cross-sectional view illustrating a display apparatus according to an exemplary embodiment of present invention.

Referring to FIG. 13, a display apparatus includes a base substrate 110, a color filter layer 320 formed on the base substrate 110 and a plurality of organic light-emitting elements formed on the color filter layer 320.

The organic light-emitting elements 310 are arranged in a matrix shape on the color filter layer 320. The organic light-emitting elements 310 generate white light. Each of the organic light-emitting elements 310 includes a first electrode 311, a second electrode 313 and an organic light-emitting layer 312. The second electrode 313 is formed on the base substrate 110, and is arranged in the matrix shape. The organic light-emitting layer 312 is formed on the second electrode 313, and the first electrode 311 is formed on the organic light-emitting layer 312.

The first electrode 311 may include, for example, a metal. The second electrode 313 may include, for example, optically transparent and electrically conductive material. For example, the optically transparent and electrically conductive material that may be used for the second electrode 313 may include indium tin oxide (ITO) or indium zinc oxide (IZO). The organic light-emitting layer 312 is disposed between the first electrode 311 and the second electrode 313.

When a voltage is applied to the first electrode 311 and the second electrode 313, a positive charge and a negative charge are generated from the first and second electrodes 311 and 313, respectively. Alternatively, the positive charge and the negative charge are generated from the second and first electrodes 313 and 311, respectively. When the positive charge is combined with the negative charge in the organic light-emitting layer 312, white light is generated. The light passes through the second electrode 313 and the color filter layer 320 to display color.

The arrangement of the color filter layer 320 is substantially equal to the arrangement of a color filter layer shown in the embodiments of FIGS. 1 to 11. Thus, any further repetitive explanation concerning the above elements will be omitted.

Figure 14:
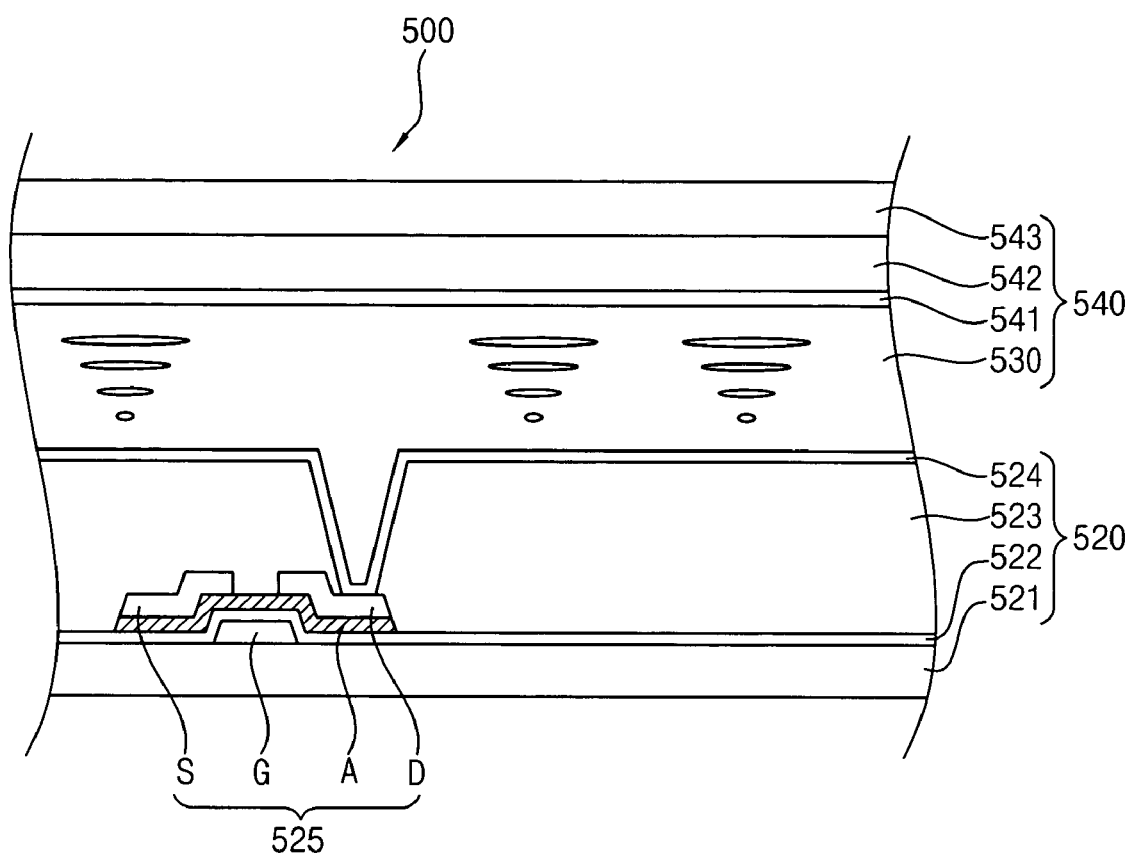
FIG. 14 is a cross-sectional view illustrating a display apparatus according to an exemplary embodiment of present invention.

FIG. 14 is a cross-sectional view illustrating a display apparatus according to an exemplary embodiment of present invention.

Referring to FIG. 14, a display apparatus 500 includes an array substrate 520, a color filter substrate 540 and a liquid crystal layer 530 disposed between the array substrate 520 and the color filter substrate 540.

The array substrate 520 includes a first base substrate 521, a switching device 525 formed on the first base substrate 521 and a pixel electrode 524. The switching device 525 includes a gate electrode G, a drain electrode D, a source electrode S, and an active layer A. The gate electrode G is formed on the first base substrate 512. A gate insulating film 522 is formed on the first base substrate 521 having the gate electrode G.

The active layer A is formed in a region corresponding to a gate electrode G on the gate insulating film 522. The source electrode S and the drain electrode D spaced apart from the source electrode S are formed on the active layer A. The switching device 525 is formed on a first base substrate 521. An insulating film 523 is formed on the first base substrate. A portion of the insulating film 523 is partially removed to form a contact hole through which a portion of the drain electrode D is exposed.

A pixel electrode 524 is formed on the insulating film 523. The pixel electrode 524 is electrically connected to the drain electrode D through the contact hole.

The color filter substrate includes a second base substrate 543, a color filter layer 542 formed on the second base substrate 543 and a common electrode layer 541 formed on the color filter layer 542. The arrangement of the color filter layer 542 is substantially equal to an arrangement of a color filter layer taken from the embodiments of FIGS. 1 to 11. Thus, any further repetitive explanation concerning the above elements will be omitted.

When a pixel voltage is applied to the pixel electrode 524 through the switching device 525, an electric field is formed in the liquid crystal layer 530 between the pixel electrode 524 and the common electrode 541 so that the optical transmissivity of the liquid crystal layer 530 is changed with respect to a molecular rearrangement of liquid crystal molecules in the liquid crystal layer 530. Therefore, an image is displayed.

The color filter substrate of exemplary embodiments of the invention may provide a display apparatus having this color filter substrate, with increased luminance and improved image display quality in comparison to conventional display apparatuses.

In addition, the color filter substrate of exemplary embodiments of the present invention may also be manufactured by a simpler process than is used in the conventional art.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A color filter substrate comprising:
a base substrate including a first pixel region and a second pixel region, the second pixel region having a first sub-region, a second sub-region and a third sub-region disposed between the first sub-region and the second sub-region;
a first color filter formed in the first pixel region and the first sub-region of the second pixel region; and
a second color filter formed in the second sub-region of the second pixel region, and wherein the first color filter of the first sub-region and the second color filter of the second sub-region mix to form a color filter in the second pixel region having a different color than the first color filter and the second color filter, and
wherein the third sub-region prevents overlapping between the first color filter formed in the first sub-region and the second color filter formed in the second sub-region.

2. The color filter substrate of claim 1, wherein the first color filter comprises a red color, a green color or a blue color.

3. The color filter substrate of claim 2, further comprising:
a plurality of first pixel regions including a red pixel region, a green pixel region and a blue pixel region; and
a plurality of first color filters including a red color filter formed in the red pixel region, a green color filter formed in the green pixel region and a blue color filter formed in the blue pixel region.

4. The color filter substrate of claim 3, further comprising:
a plurality of second pixel regions including a cyan pixel region, a magenta pixel region and a yellow pixel region; and
a plurality of second color filters including:
a blue color filter formed in a first sub-region of the cyan pixel region and a second sub-region of the magenta pixel region;
a green color filter formed in a second sub-region of the cyan pixel region and a second sub-region of the yellow pixel region; and
a red color filter formed in a first sub-region of the magenta pixel region and a first sub-region of the yellow pixel region.

5. The color filter substrate of claim 1, wherein an area of the first sub-region is substantially equal to an area of the second sub-region.

6. The color filter substrate of claim 1, wherein an area of the first sub-region is different from an area of the second sub-region.

7. The color filter substrate of claim 1, wherein a boundary between the first and second sub-regions is formed in a horizontal direction of the second pixel region.

8. The color filter substrate of claim 1, wherein a boundary between the first and the second pixel region is formed along a vertical direction of the second pixel region.

9. The color filter substrate of claim 1, wherein a boundary between the first and the second pixel has a mesh shape.

10. The color filter substrate of claim 1, wherein the first and second sub-regions are each in the form of a plurality of dot shapes.

11. A color filter substrate comprising:
a base substrate including a red pixel region, a green pixel region, a blue pixel region and a color-mixing pixel region, the color-mixing pixel region having a first sub-region, a second sub-region and a third sub-region disposed between the first sub-region and the second sub-region;
a red color filter formed in the red pixel region;
a green color filter formed in the green pixel region; and
a blue color filter formed in the blue pixel region, wherein a first color filter selected from the group consisting of a red color filter, a green color filter or a blue color filter is formed in the first sub-region and a second color filter differing from the first color filter and selected from the group consisting of a red color filter, a green color filter or a blue color filter is formed in the second sub-region, and wherein the first color filter of the first sub-region and the second color filter of the second sub-region mix to form at least one color filter selected from the group consisting of a cyan color filter, a magenta color filter or a yellow color filter in the second pixel region, and
wherein the third sub-region prevents overlapping between the first color filter formed in the first sub-region and the second color filter formed in the second sub-region.

12. A method of manufacturing a color filter substrate, comprising:
forming a black matrix having a plurality of openings on a base substrate having a first pixel region and a second pixel region, the second pixel region having a first sub-region, a second sub-region and a third sub-region disposed between the first sub-region and the second sub-region, the first and second pixel regions being exposed through the plurality of openings;
forming a first color filter in the first pixel region and the first sub-region of the second pixel region; and
forming a second color filter in the second sub-region of the second pixel region and wherein the third sub-region prevents overlapping between the first color filter formed in the first sub-region and the second color filter formed in the second sub-region.

13. The method of claim 12, wherein the first and second color filters each comprise a red color filter, a green color filter or a blue color filter.

14. The method of claim 12, wherein an area of the first sub-region is substantially equal to an area of the second sub-region.

15. The method of claim 12, wherein an area of the first sub-region is different from an area of the second sub-region.

16. The method of claim 12, wherein a boundary between the first and second sub-regions is formed in a horizontal direction of the second pixel region.

17. The method of claim 12, wherein a boundary between the first and second sub-regions is formed in a vertical direction of the second pixel region.

18. The method of claim 12, wherein a boundary between the first and second sub-regions has a mesh shape.

19. The method of claim 12, wherein each of the first and second sub-regions have a plurality of dot shapes.

20. A display apparatus comprising:
a base substrate;
a color filter layer formed on the base substrate, the color filter layer including a first pixel region and a second pixel region having a first sub-region and a second sub-region;
a light-emitting element formed in the first and second pixel regions of the base substrate;
a first color filter formed in the first pixel region and the first sub-region of the second pixel region; and
a second color filter formed in the second sub-region of the second pixel region, wherein the light-emitting element includes a first electrode; a second electrode facing the first electrode;
and an organic light-emitting layer disposed between and in direct physical contact with the first and second electrodes, and wherein the color filter layer is in direct physical contact with the second electrode.

21. The display apparatus of claim 20, wherein the first color filter comprises a red color, a green color or a blue color.

22. The display apparatus of claim 21, further comprising:
a plurality of first pixel regions including a red pixel region, a green pixel region and a blue pixel region; and
a plurality of first color filters including a red color filter formed in the red pixel region, a green color filter formed in the green pixel region and a blue color filter formed in the blue pixel region.

23. The display apparatus of claim 22, further comprising:
a plurality of second pixel regions including a cyan pixel region, a magenta pixel region and a yellow pixel region; and
a plurality of second color filters including:
a blue color filter formed in a first sub-region of the cyan pixel region and a second sub-region of the magenta pixel region;
a green color filter formed in a second sub-region of the cyan pixel region and a second sub-region of the yellow pixel region; and
a red color filter formed in a first sub-region of the magenta pixel region and a first sub-region of the yellow pixel region.

24. The display apparatus of claim 20, wherein an area of the first sub-region is substantially equal to an area of the second sub-region.

25. The display apparatus of claim 20, wherein an area of the first sub-region is different from an area of the second sub-region.

26. The display apparatus of claim 20, wherein the second pixel region further comprises a third sub-region disposed between the first and second sub-regions.

27. The display apparatus of claim 20, wherein a boundary between the first and second sub-regions is formed in a horizontal direction of the second pixel region.

28. The display apparatus of claim 20, wherein a boundary between the first and second sub-region is formed in a vertical direction of the second pixel region.

29. The display apparatus of claim 20, wherein a boundary between the first and second sub-regions has a mesh shape.

30. The display apparatus of claim 20, wherein each of the first and second sub-regions have a plurality of dot shapes.

31. A display apparatus comprising:
a color filter substrate comprising a base substrate comprising a first pixel region and a second pixel region, the second pixel region having a first sub-region, a second sub-region and a third sub-region disposed between the first sub-region and the second sub-region, a first color filter-formed in the first pixel region and the first sub-region of the second pixel region, and a second color filter formed in the second sub-region of the second pixel region;
an array substrate facing the color filter substrate, the array substrate including a pixel electrode and a switching device that applies a pixel voltage to the pixel electrodes; and
a liquid crystal layer disposed between the array substrate and the color filter substrate, and wherein the first color filter of the first sub-region and the second color filter of the second sub-region mix to form a color filter in the second pixel region having a different color than the first color filter and the second color filter, and
wherein the third sub-region prevents overlapping between the first color filter formed in the first sub-region and the second color filter formed in the second sub-region.

32. The display apparatus of claim 31, wherein the first color filter comprises a red color, a green color or a blue color.

33. The display apparatus of claim 32, further comprising:
a plurality of first pixel regions including a red pixel region, a green pixel region and a blue pixel region; and
a plurality of first color filters including a red color filter formed in the red pixel region, a green color filter formed in the green pixel region and a blue color filter formed in the blue pixel region.

34. The display apparatus of claim 33, further comprising:
a plurality of second pixel regions each including a cyan pixel region, a magenta pixel region and a yellow pixel region; and
a plurality of second color filters each including:
a blue color filter formed in a first sub-region of the cyan pixel region and a second sub-region of the magenta pixel region;
a green color filter formed in a second sub-region of the cyan pixel region and a second sub-region of the red color filter; and
a red color filter formed in a first sub-region of the magenta pixel region and a first sub- region of the yellow pixel region.

35. The display apparatus of claim 31, wherein an area of the first sub-region is substantially equal to an area of the second sub-region.

36. The display apparatus of claim 31, wherein an area of the first sub-region is different from an area of the second sub-region.

37. The display apparatus of claim 31, wherein a boundary between the first and second sub-regions is formed in a horizontal direction of the second pixel region.

38. The display apparatus of claim 31, wherein a boundary between the first and second sub-regions is formed in a vertical direction of the second pixel region.

39. The display apparatus of claim 31, wherein a boundary between the first and the second sub-region has a mesh shape.

40. The display apparatus of claim 20, wherein each of the first and the second sub-regions have a plurality of dot shapes.

* * * * *